April 29, 1941. P. BURKE ET AL Re. 21,785

NAPKIN FOLDING MACHINE

Original Filed Nov. 1, 1932 4 Sheets-Sheet 1

INVENTORS
John Edward Blosser
Paul Burke
BY
Ross Ahmey
ATTORNEY

April 29, 1941. P. BURKE ET AL Re. 21,785

NAPKIN FOLDING MACHINE

Original Filed Nov. 1, 1932 4 Sheets-Sheet 2

INVENTORS
John Edward Blosser
Paul Burke
BY Ross C. Hurey
ATTORNEY

April 29, 1941. P. BURKE ET AL Re. 21,785

NAPKIN FOLDING MACHINE

Original Filed Nov. 1, 1932 4 Sheets-Sheet 3

INVENTORS
John Edward Blosser
Paul Burke
BY Ross C. Harney
ATTORNEY.

April 29, 1941. P. BURKE ET AL Re. 21,785

NAPKIN FOLDING MACHINE

Original Filed Nov. 1, 1932 4 Sheets-Sheet 4

INVENTORS
John Edward Blosser
Paul Burke
BY Ross C. Hurney
ATTORNEY

Reissued Apr. 29, 1941 Re. 21,785

UNITED STATES PATENT OFFICE 21,785

NAPKIN FOLDING MACHINE

Paul Burke, South Glens Falls, and John Edward Blosser, Glens Falls, N. Y., assignors, by mesne assignments, to International Tissue Corp., New York, N. Y., a corporation of New York Original No. 1,992,179, dated February 26, 1935, Serial No. 640,582, November 1, 1932. Application for reissue October 25, 1940, Serial No. 362,840

12 Claims. (Cl. 270—41)

Our invention relates to a machine for folding, assembling and severing paper napkins, facial tissues, and the like.

As is well known, paper napkins and facial tissues usually comprise rectangular sections cut from a web of cellulosic material suitable for the use to which the napkin or tissue is intended to be put. Especially in the case of facial tissues this cellulosic material or paper is very thin, soft, possesses little strength, and must be handled very carefully while it is being folded and prepared for packaging. These sections or a plurality thereof are folded and a considerable number of such folded napkins or tissues are packaged together as a unit.

Heretofore much of the labor incidental to the folding, assembling and severing of such napkins or tissues has either been accomplished manually or by the use of machines of limited output, and it is therefore an object of our present invention to provide apparatus for folding, assembling and severing napkins, tissues, or the like, which is simple, rapid and well suited to the characteristics of the soft cellulosic material to be handled therein.

Our invention has for further objects numerous detailed improvements in construction and operative advantages as will hereinafter be found to obtain.

Our invention contemplates means for continuously drawing a plurality of webs from a corresponding number of rolls of suitable material, folding and advancing the same to assemble a combined web of a considerable number of individual folded webs, and means for cutting the combined web in convenient lengths.

In order to properly sever the combined web and obtain a straight cut, it is desirable to have the web stationary with respect to the shearing device at the moment of severing. However, the cellulosic material is usually supplied in rolls which are of considerable size and inertia and which would be difficult to unwind in an intermittent manner. Consequently, according to our invention, that portion of the apparatus which serves to draw the individual webs from the several rolls to fold the web and combine the individual folded webs into a single combined web, operates continuously.

Once formed, the combined web is transferred to an intermittently operating conveying device which carries the combined web past the point of shear, the severing operation taking place while the web is stationary.

We further provide a suitable rest or guide for the combined web lying between the continuously operating folder and combiner and the subsequent intermittently operating conveyor which carries the combined web through the shearing station.

In order that our invention may be clearly set forth and understood in its several aspects, we now describe with reference to the drawings accompanying and forming a part of this specification, a preferred manner in which our invention may be embodied and utilized. In these drawings.

Similar reference characters designate the same or similar parts in the several views of the drawings.

Figures 1, 2:
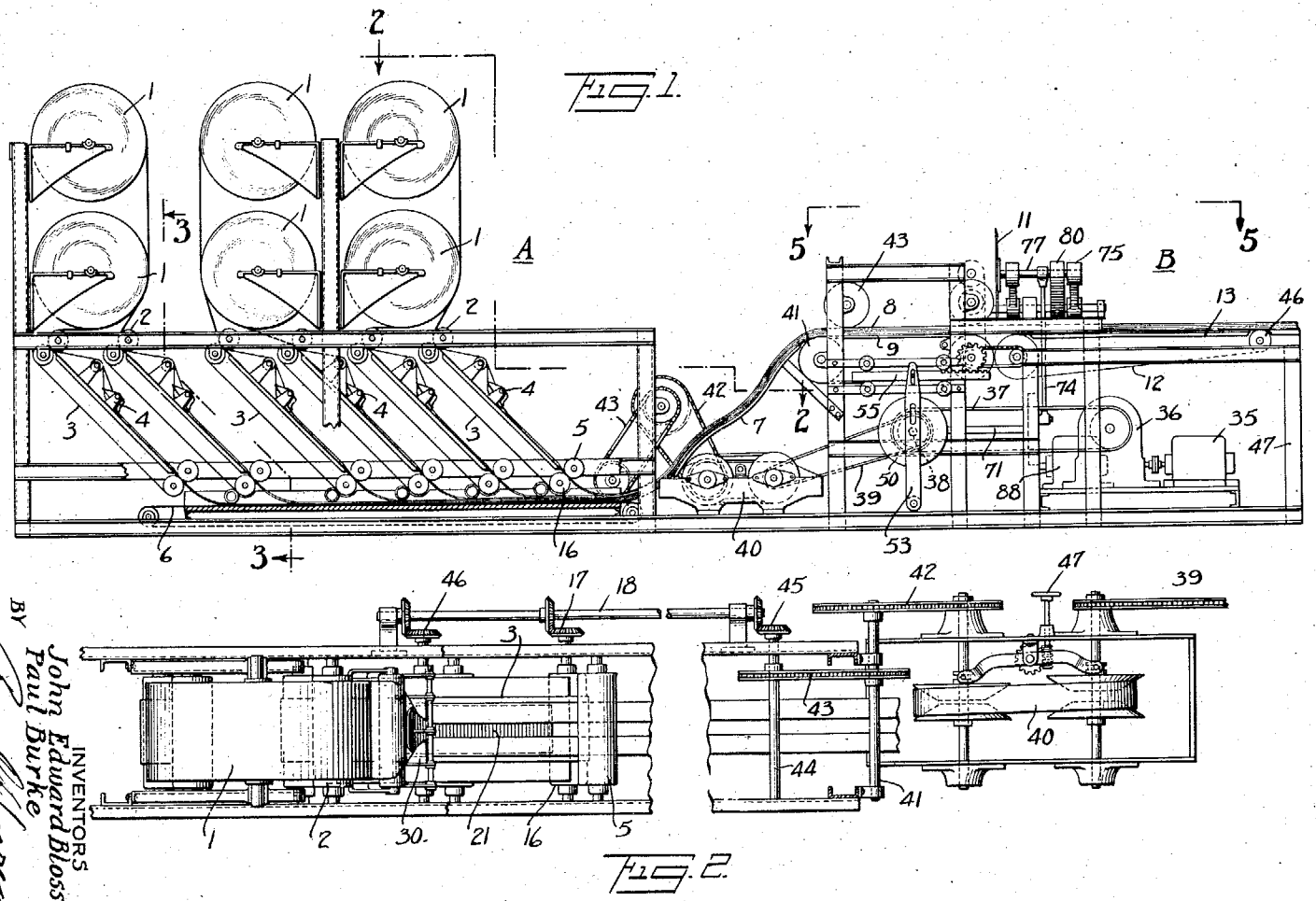
Fig. 1 is a side-elevational view of a machine for folding, assembling and severing napkins constructed in accordance with our invention.
Fig. 2 is a view, partly in plan and partly in horizontal section, of a portion of the apparatus shown in Fig. 1, taken along the line 2—2 of Fig. 1.

Referring now to the drawings, the apparatus of our invention comprises principally a folding and assembling end indicated generally by the character of reference A, and a severing and delivery end indicated generally by the character of reference B. The napkins or tissues are drawn from a plurality of rolls 1 of suitable material and pass around rolls 2 onto a plurality of inclined conveyors 3 which are provided with means for folding the web indicated generally by the reference numeral 4.

The webs then pass under rollers 5 onto a main assembly conveyor 6, the various webs being fed serially to the conveyor 6 in accordance with the length of the conveyor 6 and the number of rolls and feeding conveyors 3 provided therefor.

At the forward end of the conveyor 6 the combined folded web passes upward over a curved guide or supporting plate 7 into the grip of belts 8 and 9, which advance intermittently. Immediately after leaving the grip of the belts 8 and 9, and while the combined web is in a stationary position, the combined web is severed by means of a rotating shear 11 which is caused to traverse the web at each interval between successive forward motions of the web through the severing and delivery end B. The combined severed lengths of folded material, which now comprise individual bundles of folded napkins or tissues, are then delivered by means of an intermittently operating conveyor 12 onto a table 13 where they are packaged by an operator singly or in bundles, as desired.

Figure 3:
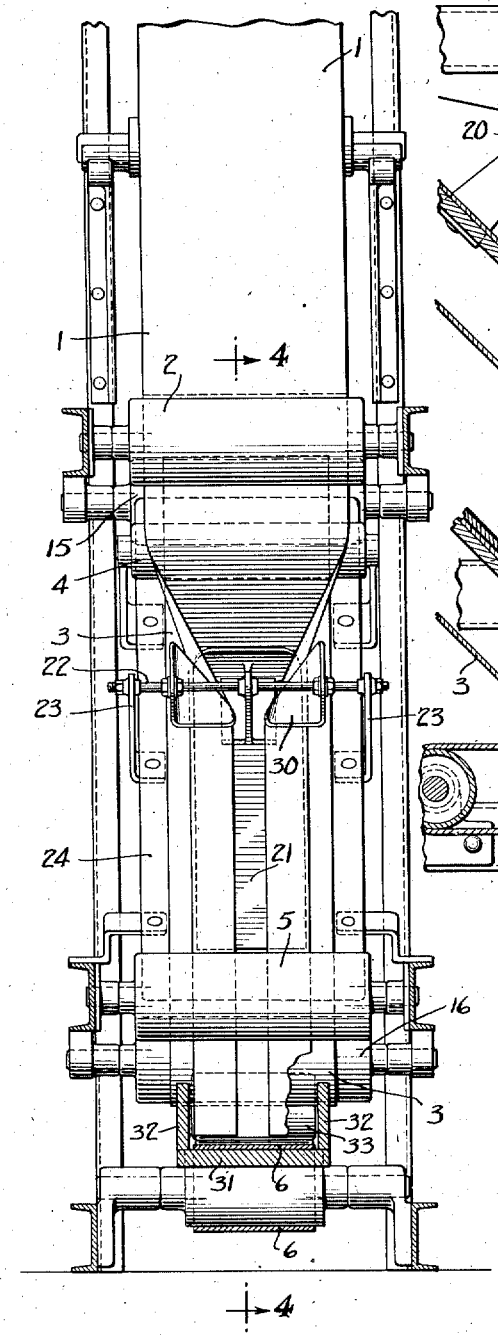
Fig. 3 is a vertical sectional view of a portion of the apparatus shown in Fig. 1, taken along the line 3—3 of Fig. 1.
Figure 4:
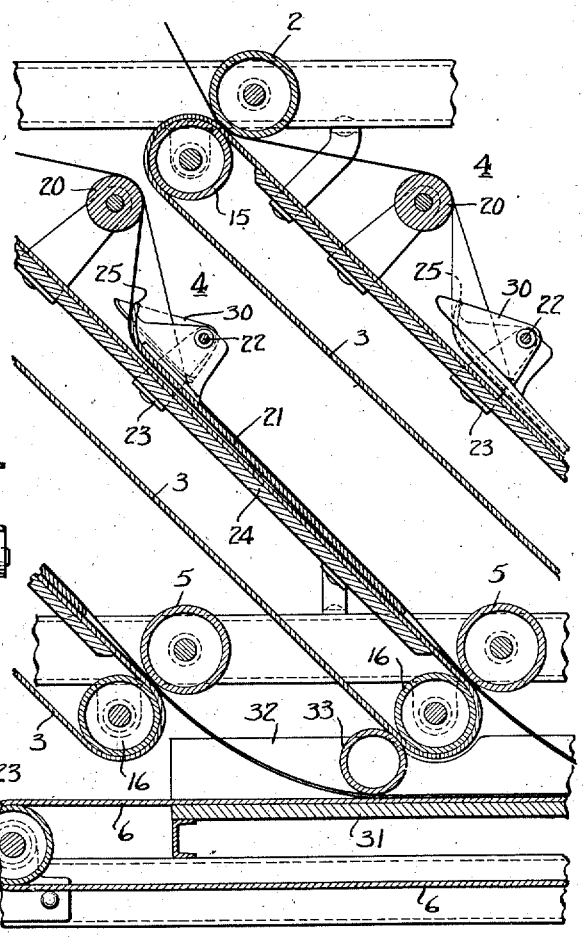
Fig. 4 is a vertical sectional view of a portion of the apparatus shown in the preceding figures, taken along the line 4—4 of Fig. 3.
Figure 5:
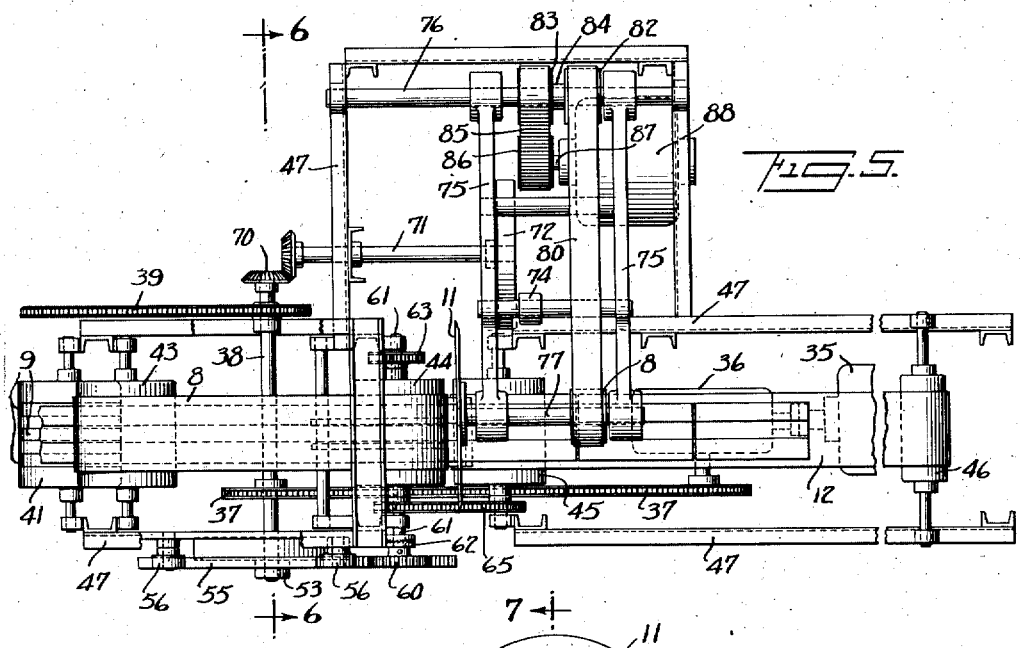
Fig. 5 is a plan view of a further portion of the apparatus shown in Fig. 1, taken along the line 5—5 of Fig. 1.
Figure 6:
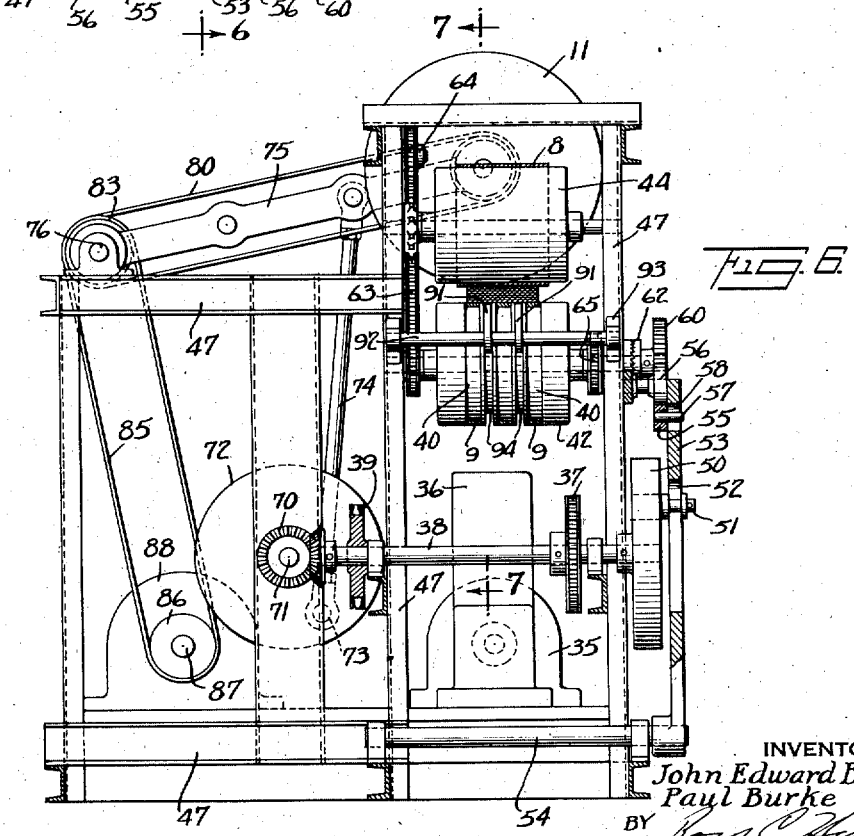
Fig. 6 is a vertical sectional view of a portion of the apparatus shown in Figs. 1 and 5, taken along the line 6—6 of Fig. 5.
Figure 7:
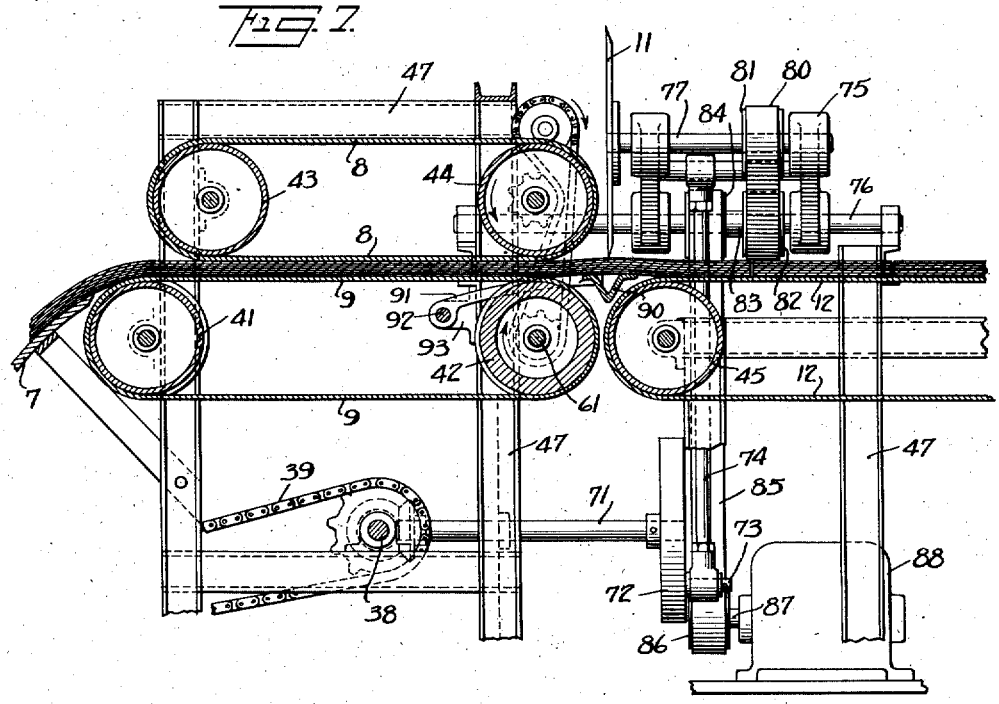
Fig. 7 is a vertical sectional view of a portion of the apparatus shown in Figs. 1, 5 and 6, taken along the line 7—7 of Fig. 6.
Figure 8:
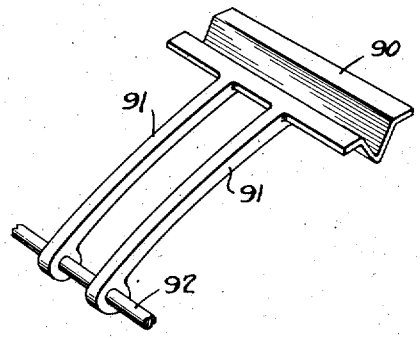
Fig. 8 is a perspective view of a portion of the apparatus shown in Figs. 1, 5, 6 and 7.

The details of the folding apparatus 4 and the manner in which it cooperates with the conveyors 3 and 6 are best illustrated in Figs. 3 and 4. Referring to these figures, each of the conveyor belts 3 passes over pulleys 15 and 16 located opposite the rolls 2 and 5, respectively, and is driven through appropriate gears 17 from a drive shaft 18 at a speed identical with that of the conveyor 6.

The web of cellulosic paper or tissue passes between the roller 2 and the belt 3 passing over the pulley 15, then leaves the belt 3 to pass over a roller 20 which is elevated above the belt 3. Under the combined influence of the roller 5 and the belt 3 the web is then drawn downward over a forming plate 21, supported immediately above the upper surface of the belt 3 by means of a rod 22 mounted in brackets 23 upon an inclined plate 24 which serves to support the upper portion of the belt 3.

The forward end 25 of each of the forming plates 21 is curved upwardly to receive the web moving downward from the roller 20. The width of each of the forming plates 21 is made equal to the desired width of the folded napkin or tissue.

As the web passes over the roller 20 and downward under the forming plate 21, the outer edges of the web encounter forming plates 30 of more or less triangular shape, so located with respect to the web that they cause the outer edges of the web to be folded inward over the upper surface of the forming plate 21. The plates 30 may conveniently be mounted upon the rod 22 as shown.

The folded web of material then passes downward past the end of the forming plate 21 under the roller 5 and onto the moving conveyor belt 6, the upper surface of which is supported upon a plate 31 having vertical sides 32 adapted to act as guides for the moving web. Free rollers 33 having a diameter a little larger than the minimum distance between any of the belts 3 and the upper surface of the belt 6 may be provided, as shown, to assist in combining the several webs on the conveyor 6.

Motive power for conveyors 3 and 6 is supplied by means of a motor 35 and a speed reducer 36 which through a sprocket chain 37 drives a shaft 38. The shaft 38 is in turn connected by means of a suitable sprocket chain 39 to a variable speed regulator 40 of well known type. The speed regulator 40 in turn drives a shaft 41 through a sprocket chain 42 and the shaft 41 is in turn connected by means of a sprocket chain 43, a shaft 44 and suitable gearing 45 to the main drive shaft 18. The pulleys 16 of the conveyors 6 are driven from the shaft 18 by means of suitable gearing 46.

By means of a regulating handle 47, the speed regulator 40 may be adjusted to give a considerable range in the ratio of the speed of the chain 37 to the speed of the conveyors 3 and 6, and this ratio is so adjusted that the combined web is fed to the severing end B at exactly the proper speed.

The plate 7 is preferably curved, as shown, to provide for the frequent periods in which the upper end of the combined web entering the grip of the belts 8 and 9 is stationary, while the combined web being fed onto the plate 7 by means of the conveyor 6 is moving forward continuously. Curved as shown in the drawings, the plate 7 permits the combined web to buckle sufficiently to accommodate the periodic fluctuations caused by this manner of operation of the two ends of the machine, without, however, injuring the material or allowing the folded webs to be opened up or disarranged.

The belt 9 is constituted of three sections traveling in grooves 48 in pulleys 41 and 42, whereas the belt 8 is single and passes over pulleys 43 and 44, while the belt 12 passes over pulleys 45 and 46. All of the above pulleys are mounted on shafts suitably journaled in bearings mounted upon a supporting frame 47.

The shaft 38 carries a wheel 50 having a pin 51 adapted to engage a slot 52 in an arm 53 fastened at its lower end to a shaft 54. A rack 55 mounted between rollers 56 carries a pin 57 adapted to engage a slot 58 in the upper end of the arm 53. As the shaft 38 rotates, the rotation of the pin 51 swings the arm 53 backward and forward about the shaft 54, thus reciprocating the rack 55.

A pinion 60 is mounted upon one end of a shaft 61 which carries the pulley 42, and meshes with the teeth of the rack 55. The pinion 60 drives the shaft 61 through a ratchet device or one-way clutch 62, the arrangement being such that during one-half revolution of the shaft 38, the rack causes the shaft 61 and pulley 42 to rotate, while during the next half revolution of the shaft 38, the shaft 61 remains stationary. The shaft 61 is thus caused to rotate intermittently.

The pulley 44 and belt 8 are driven from the shaft 61 by means of a sprocket chain 63 which passes over an idle sprocket 64. The shaft 61 also drives the pulley 45 and belt 12 through a sprocket chain 65. Thus, the belts 8, 9 and 12 advance in a series of intermittent forward movements. By means of the regulator 40, the speed of the conveyors 6 and 3 is adjusted to equal the average speed of the belts 8, 9 and 12.

The shaft 38 also serves to operate the shear 11. Through bevel gears 70, the shaft 38 drives a shaft 71 carrying a wheel 72 having a pin 73 which is pivotally connected to the lower end of an arm 74. The upper end of the arm 74 is pivotally connected to a frame 75 one end of which is pivotally connected to a shaft 76 and the other end of which carries a shaft 77 on which is mounted the shear blade 11. As the wheel 72 rotates, the arm 74 causes the shear blade 11 to traverse the combined web at a point between the belts 9 and 12.

The blade 11 is driven by a belt 80 which passes over a pulley 81 on the shaft 77 and a pulley 82 on the shaft 76. The pulley 82 is connected to a pulley 83 by means of a sleeve 84, the pulleys 82 and 83 and the sleeve 84 rotating freely about the shaft 76. The pulley 83 is in turn connected by a belt 85 to a pulley 86 on a shaft 87 driven by a motor 88. Thus, the shear blade 11 rotates independently of the position of the frame 75.

Support for the combined web at the moment and place of severing is provided by means of a trough-shaped plate 90 located between the pulleys 42 and 45. The plate 90 is supported by means of a pair of curved arms 91, the upper surfaces of which are made flush with the upper and outer surfaces of the plate 90. The arms 91 are attached at the ends opposite the plate 90 to a rod or shaft 92, the ends of which are in turn fastened to lugs 93 supported on one of the uprights of the frame 47.

The arms 91 pass through grooves 94 in the pulley 42, which grooves 94 are located between the grooves 40 which accommodate the three sections of the belt 9, and the curvature of the arms 91 is such that the upper surfaces of the arms 91 are flush with the upper surfaces of the belts 9, the relationship being such that the combined web leaving the belt 9 progresses forward smoothly supported by the upper surfaces of the arms 91 and the upper and outer surfaces of the plate 90. The configuration of the trough-shaped plate 90 is such that it forms a support for the combined web at the moment it is traversed by the shear blade 11, but does not come in contact with or obstruct the action of the blade 11.

It will be apparent from the above that the number of individual webs which are folded and assembled to form the combined web is limited only by considerations of space and convenience. Any number of rolls 1, conveyors 3 and folders 2 may be provided as desired, and the rolls 1 may be wound singly or doubly as desired. In the case of facial tissues it is common to supply rolls 1 which are wound double so that the individual webs fed to the conveyors 3 and the folders 4 each actually comprises two ply of material.

Figure 9:
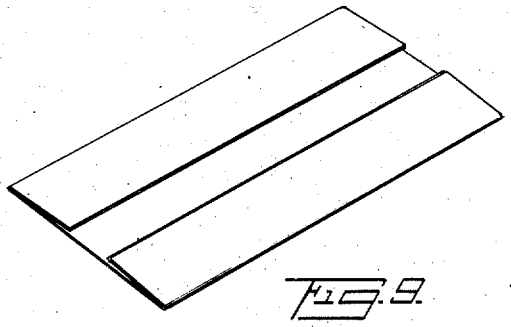
Fig. 9 is a perspective view of a napkin or facial tissue which has been folded and severed by means of the apparatus illustrated in the preceding figures.

The various webs after being folded are thus assembled to form a combined web which then passes forward to the curved plate 7 with continuous uniform motion. The combined web leaves the plate 7 to enter the grip of the intermittently moving belts 8 and 9 and thenceforth progresses in a series of intermittent motions, the length of which is adjusted in accordance with the desired length of the severed napkins or tissues. Each time the motion of the combined web is arrested, the shear blade 11 traverses the combined web, thus severing the web into short lengths, each of which comprises a bundle of finished napkins such as that illustrated in Fig. 9. These units then move forward on the conveyor 12 and the table 13 and are received and packaged by an operator.

By the use of our invention it is possible to accomplish the manufacture of paper napkins and folded facial tissues automatically at a higher rate of speed than has heretofore been possible and without injury to the delicate material of which the napkins or tissues are made.

It will be obvious to those skilled in the art that the apparatus illustrated in the drawings and described in the specification by way of illustrative example may be considerably altered in detail without departing from our invention, and our invention is therefore not limited to the details of such exemplification, but may variously be embodied within the scope of the claims hereinafter made.

We claim:

1. In a machine for folding, combining and severing tissue napkins and the like, a supporting frame, a plurality of reeled tissue webs carried by said frame, means for simultaneously withdrawing and superposing said webs from the reels, means for folding the individual webs being thus withdrawn, an endless belt conveyor for supporting the superposed folded webs, and means including an intermittently operable shearing device associated with said conveyor and adapted to sever said superposed webs at timed intervals.

2. In a machine for folding, combining and severing tissue napkins and the like, a supporting frame, a plurality of reeled tissue webs carried by said frame, means for simultaneously withdrawing and superposing said webs from the reels, means for folding the individual webs being thus withdrawn prior to actual superposition thereof, an endless belt conveyor for supporting the superposed folded webs, and means including an intermittently operable shearing device associated with said conveyor and adapted to sever said superposed webs at timed intervals.

3. In a machine for folding, combining and severing tissue napkins and the like, a supporting frame, a plurality of reeled tissue webs carried by said frame, means for simultaneously withdrawing and superposing said webs from the reels, means for folding the outer edge portions of the individual webs being thus withdrawn inwardly over the central portions thereof, an endless belt conveyor for supporting the superposed folded webs, and means including an intermittently operable shearing device associated with said conveyor and adapted to sever said superposed folded webs at timed intervals.

4. Apparatus for folding, combining and severing napkins and the like, which comprises, in combination, an assembling conveyor adapted to move continuously, means for superimposing a plurality of folded webs of material on said assembling conveyor, an intermittent conveyor adapted to receive said webs and to advance said webs in a series of intermittent forward movements, and a shearing device adapted to sever said webs transversely at each interval between successive forward movements of said intermittent conveyor.

5. Apparatus for folding, combining and severing napkins and the like, which comprises, in combination, an assembling conveyor adapted to move continuously, means for superimposing a plurality of folded webs of material on said assembling conveyor, an intermittent conveyor adapted to receive said webs and to advance said webs in a series of intermittent forward movements, a support for said webs located between said assembling conveyor and said intermittent conveyor and adapted to support that portion of said webs lying between said conveyors during the intervals between successive forward movements of said intermittent conveyor, and a shearing device adapted to traverse and sever said webs at each interval between successive forward movements of said intermittent conveyor.

6. Apparatus for folding, combining and severing napkins and the like, which comprises, in combination, an assembling conveyor adapted to move continuously, means for successively feeding a plurality of folded webs of material to said assembling conveyor, an intermittent conveyor adapted to receive said webs and to advance said webs in a series of intermittent forward movements, a shearing device adapted to traverse and sever said webs at each interval between successive forward movement of said intermittent conveyor, and means for varying the relative speeds of said assembling conveyor and said intermittent conveyor.

7. Apparatus for folding, combining and severing napkins and the like, which comprises, in combination, an assembling conveyor adapted to move continuously, means for successively feeding a plurality of folded webs of material to said assembling conveyor, a pair of intermittent conveyors located in series and adapted to receive said webs and to advance said webs in a series of intermittent forward movements, a shearing blade located between said intermittent conveyors and adapted to traverse and sever said webs at each interval between successive forward movements of said intermittent conveyors, and a support for said webs located opposite said shearing blade and having a recess adapted to receive a portion of said blade at the moment of severing.

8. In apparatus for forming napkins and the like, in combination, a conveyor adapted to move intermittently, means for feeding a plurality of folded webs of material to said conveyor, a second intermittent conveyor adapted to receive said webs from said first-named conveyor and to advance said webs, a rotating shear blade located between said conveyors, and means for causing said shear blade to traverse and sever said webs at each interval between successive forward movements of said conveyors.

9. In apparatus for folding and combining napkins and the like, in combination, a main belt conveyor adapted to move continuously, and means for successively feeding a plurality of folded webs of material to said continuous conveyor, said means comprising a plurality of feeding belt conveyors located in series along axes inclined toward the axis of said main belt conveyor and moving in synchronism therewith, said feeding belt conveyors being adapted to draw webs of material from a corresponding plurality of rolls of said material and to advance said webs successively onto said main belt conveyor, a forming plate adjacent each of said feeding conveyors, and folding plates cooperating with each of said forming plates and adapted to fold the outer sides of said webs inward during their progress toward said main belt conveyor.

10. In apparatus for severing napkins or the like, a moving belt, a plurality of spaced belts located adjacent and opposite to said belt and adapted to cooperate with said belt to advance a plurality of webs of napkin material, a roller having a plurality of belt grooves adapted to receive said plurality of belts and a groove located intermediate said belt grooves, and a supporting plate for said webs extending beyond said belts and having an arm passing through said intermediate groove to a point of support, the upper surface of said arm and said plate being substantially flush with the upper surface of said plurality of belts.

11. Apparatus for folding and combining napkins and the like, which comprises in combination, an assembling, substantially horizontal, belt conveyor, a plurality of inclined conveyors each adapted to deliver a web to said assembling conveyor, and means adjacent said inclined conveyors to hold said webs longitudinally.

12. Apparatus for folding and combining napkins and the like comprising, a substantially horizontal belt conveyor, a plurality of inclined belt conveyors adjacent thereto each adapted to deliver napkin material to said horizontal conveyor, said inclined belt conveyors ending at a distance above said horizontal conveyor, and a plurality of free rollers of larger diameter than the minimum distance between said conveyors each positioned in one of the acute angles formed by said conveyors.

JOHN EDWARD BLOSSER.
PAUL BURKE.